United States Patent [19]

Koyama et al.

[11] Patent Number: 5,315,898

[45] Date of Patent: May 31, 1994

[54] METHOD OF CONTROLLING AUTOMATIC TRANSMISSION

[75] Inventors: Hideo Koyama, Shinjuku; Nobuo Takemasa, Wako, both of Japan

[73] Assignee: Honda Giken Kogyo Kabushiki Kaisha, Tokyo, Japan

[21] Appl. No.: 898,986

[22] Filed: Jun. 15, 1992

[30] Foreign Application Priority Data

Jun. 14, 1991 [JP] Japan .................................. 3-169219

[51] Int. Cl.$^5$ ............................................... F16H 3/66
[52] U.S. Cl. .................................... 475/330; 475/116; 475/127
[58] Field of Search .................... 74/861, 865, 866; 364/424.1; 475/330

[56] References Cited

U.S. PATENT DOCUMENTS

| | | | |
|---|---|---|---|
| 4,903,551 | 2/1990 | Hiramatsu et al. | 74/866 X |
| 4,984,483 | 1/1991 | Hiramatsu et al. | 74/866 |
| 5,094,130 | 3/1992 | Hirose et al. | 74/866 X |
| 5,097,726 | 3/1992 | Asada | 364/424.1 X |
| 5,125,294 | 6/1992 | Takashi et al. | 364/424.1 X |
| 5,141,477 | 8/1992 | Oshidari | 475/330 |
| 5,165,308 | 11/1992 | Asada et al. | 475/330 |

FOREIGN PATENT DOCUMENTS

| | | |
|---|---|---|
| 62-137457 | 6/1987 | Japan . |
| 2-80835 | 3/1990 | Japan .................................. 475/330 |

OTHER PUBLICATIONS

English language of JP Abstract 62-137457.

*Primary Examiner*—Leslie A. Braun
*Assistant Examiner*—Ryan W. Massey
*Attorney, Agent, or Firm*—Lyon & Lyon

[57] ABSTRACT

An automatic transmission has, between input and output shafts, a plurality of power transmitting paths composed of combinations of planetary gear trains, and a plurality of engaging units for selecting one of the power transmitting paths for establishing a desired gear position. An upshift is effected from a present gear position to a target gear position which is higher than the present gear position through disengagement of two engaging units and engagement of two other engaging units. A controlling intermediate gear position is selected which is higher than the target gear position and which can be shifted to from the present gear position and the target gear position only through disengagement of one of the engaging units and engagement of another of the engaging units. When an upshift command is issued, the transmission starts shifting from the present gear position to the controlling intermediate gear position. The rotating condition of the gear trains is detected after the shifting from the present gear position to the controlling intermediate gear position is started. When the detected rotating condition reaches a rotating condition which substantially corresponds to the target gear position, the transmission is shifted from the controlling intermediate gear position to the target gear position.

4 Claims, 6 Drawing Sheets

METHOD OF CONTROLLING AUTOMATIC TRANSMISSION

BACKGROUND OF THE INVENTION

1. Field of the Invention

The present invention relates to a method of controlling an automatic transmission comprising a plurality of gear trains, and more particularly to a method of controlling upshifts in such an automatic transmission.

2. Description of the Prior Art

Various automatic transmissions with a plurality of gear trains are known in the art. One such automatic transmission comprises a planetary gear automatic transmission as disclosed in Japanese laid-open patent publication No. 62-137457.

The disclosed planetary gear automatic transmission has, between input and output shafts, a plurality of power transmitting paths composed of combinations of planetary gear trains, and a plurality of engaging means (clutches and brakes) for selecting one of the power transmitting paths for establishing a desired gear position. The gear positions of the automatic transmission are controlled by controlling operation of the engaging means.

In such planetary gear automatic transmissions, the gear positions are mostly established by engaging and disengaging the engaging means. It is sometimes necessary to engage and disengage a plurality of engaging means simultaneously for changing gear positions. For example, for shifting from one gear position to another gear position over two or more gear positions, the planetary gear automatic transmission disclosed in the above publication is required to disengage two engaging means and engage two other engaging means.

Since controlling such simultaneously engagement and disengagement of plural engaging means is quite complex, when a shift command is issued to shift from one gear position to another gear position over two or more gear positions, the disclosed planetary gear automatic transmission actually operates to successively go through, or, to establish, the intermediate gear positions until the target gear position is reached, rather than skipping from the present gear position directly to the target gear position. In the disclosed planetary gear automatic transmission, one of the plural engaging means which are engaged in adjacent gear positions serves as a common engaging means. Thus, when the transmission goes successively through a plurality of gear positions, only one engaging means may be disengaged and only one engaging means may be engaged to establish each of the gear positions. As a result, the transmission control process is relatively simple.

According to the above transmission control process, inasmuch as the intermediate gear positions are actually established one by one when the transmission is shifted from the present gear position to the target gear position, the acceleration of the automobile which incorporates the automatic transmission and the rotational speed of the engine combined with the automatic transmission are rendered irregular or discontinuous at the time the intermediate gear positions are established. Therefore, the driver or passengers of the automobile tend to feel awkward because of such acceleration or engine speed irregularities.

It is possible to shift from the present gear position directly to the target gear position while skipping the intermediate gear positions. For such shifting, it is necessary to simultaneously disengage the two engaging means which are engaged to establish the present gear position and to simultaneously engage the two engaging means which are engaged to establish the target gear position. Since these engaging means should be disengaged and engaged in precise synchronism, the rotational speeds of rotating members in the transmission need to be detected accurately and complex control procedures are required. Therefore, the overall control process is highly complicated and difficult to achieve.

Particularly, a certain gear position can be established only when two engaging means are engaged. Consequently, if one of the engaging means is engaged out of synchronism with the other engaging means, then the transmission is liable to be held in an unwanted neutral condition allowing the engine to race, or gears of two power transmitting paths are apt to mesh simultaneously.

SUMMARY OF THE INVENTION

In view of the aforesaid drawbacks of the conventional control process for automatic transmissions, it is an object of the present invention to provide a method of controlling an automatic transmission to effect simply and smoothly upshifts which require engagement of a plurality of engaging means and disengagement of a plurality of engaging means.

According to the present invention, there is provided a method of controlling an automatic transmission having, between input and output shafts, a plurality of power transmitting paths composed of combinations of planetary gear trains, and a plurality of engaging means for selecting one of the power transmitting paths for establishing a desired gear position, to effect an upshift from a present gear position to a target gear position which is higher than the present gear position through disengagement of two units of engaging means and engagement of other two units of engaging means, the method comprising the steps of selecting a controlling intermediate gear position which is higher than the target gear position and which can be to shifted from the present gear position and from the target gear position only through disengagement of one of the engaging means and engagement of another of the engaging means, starting to shift from the present gear position to the controlling intermediate gear position in response to a command for an upshift, detecting a rotating condition of the gear trains after the shifting from the present gear position to the controlling intermediate gear position is started, and shifting from the controlling intermediate gear position to the target gear position when the detected rotating condition reaches a rotating condition which substantially corresponds to the rotating condition target gear position.

The controlling intermediate gear position used to shift from the present gear position to the target gear position is higher than the target gear position. The rotating condition of the gears in the transmission which corresponds to the target gear position is therefore of a level between the rotating condition corresponding to the present gear position and the rotating condition corresponding to the controlling intermediate gear position. Upon shifting from the present gear position to the controlling intermediate gear position, therefore, the rotating condition of the gears in the transmission varies through the rotating condition corresponding to the target gear position to the rotating condition corresponding to the controlling intermediate gear position.

The rotating condition is detected, and when the rotating condition substantially corresponds to the target gear position as it varies from the rotating condition corresponding to the present gear position to the rotating condition corresponding to the controlling intermediate gear position, the transmission is shifted from the controlling intermediate gear position to the target gear position. Since the rotating condition reaches the rotating condition corresponding to the target gear position at the time the transmission starts shifting to the target gear position, the transmission can smoothly be shifted into the target gear position.

In the above controlling method, the transmission is shifted into the target gear position while attempts are being made to shaft to the controlling intermediate gear position. Inasmuch as the rotating condition corresponding to the target gear position exists in the process of varying the rotating condition of the gears from the rotating condition corresponding to the present gear position to the rotating condition corresponding to the controlling intermediate gear position, the shifting to the controlling intermediate gear position is controlled to switch to shifting to the target gear position when the rotating condition reaches the rotating condition corresponding to the target gear position in the process of shifting to the controlling intermediate gear position. As a consequence, the upshift from the present gear position to the target gear position is smoothly carried out.

The shift from the present gear position to the controlling intermediate gear position requires only one engaging means to be disengaged and only one engaging means to be engaged. Likewise, the shift from the controlling intermediate gear position to the target gear position requires only one engaging means to be disengaged and only one engaging means to be engaged. Accordingly, the automatic transmission can simply be shifted from the present gear position to the target gear position.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
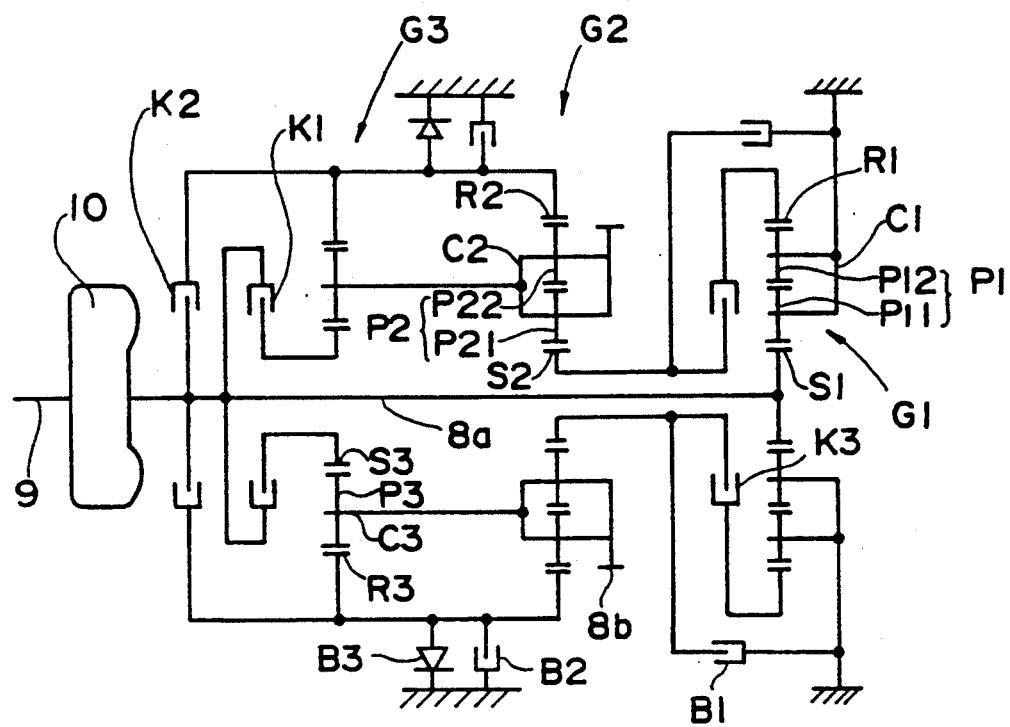
FIG. 1 a diagram showing a skeleton of an automatic transmission which is controlled by a method according to the invention.

FIG. 1 schematically shows an automatic transmission which is controlled by a method according to the present invention. The automatic transmission is mounted on an automobile (not shown).

The automatic transmission shown in FIG. 1 comprises a torque converter 10 coupled to an engine output shaft 9 of the engine mounted on the automobile, and a transmission mechanism having a transmission input shaft 8a connected to the turbine of the torque converter 10.

The transmission mechanism has first, second, and third planetary gear trains G1, G2, G3 disposed in juxtaposed relationship on the transmission input shaft 8a. The planetary gear trains G1, G2, G3 have respective first, second, and third sun gears S1, S2, S3 positioned centrally, respective first, second, and third planet pinions P1, P2, P3 meshing with the first, second, and third sun gears S1, S2, S3, respectively, and revolvable around the first, second, and third sun gears S1, S2, S3 while rotating about their own axes, respective first, second, and third carriers C1, C2, C3 on which the first, second, and third planet pinions P1, P2, P3 are rotatably supported, the second and third carriers C2, C3 being rotatable in unison with the second and third planet pinions P2, P3 as they revolve around the second and third sun gears S2, S3, and respective first, second, and third ring gears R1, R2, R3 comprising internal gears meshing with the first, second, and third planet pinions P1, P2, P3, respectively.

Each of the first and second planetary gear trains G1, G2 comprises a double-pinion planetary gear train. The first planet pinion P1 comprises pinion gears P11, P12, and the second planet pinion P2 comprises pinion gears P21, P22. The third planetary gear train G3 comprises a single-pinion planetary gear train.

The first sun gear S1 is fixedly coupled to the input shaft 8a, and the first carrier C1 is fixed against rotation at all times. The first ring gear R1 is disconnectably connected to the second sun gear S2 through a third clutch K3. The second sun gear S2 can be fixed against rotation by a first brake B1. The second carrier C2 is directly coupled to the third carrier C3, and also to an output gear 8b. Therefore, rotation of the second and third carriers C2, C3 is transmitted from the output gear 8b as output rotation of the transmission mechanism. The second ring gear R2 is directly coupled to the third ring gear R3. The second and third ring gears R2, R3 can be fixed against rotation by a second brake B2. The second and third ring gears R2, R3 are disconnectably connected to the transmission input shaft 8a by a second clutch K2. The third sun gear S3 is disconnectably connected to the transmission input shaft 8a through a first clutch K1. The second and third ring gears R2, R3 can also be braked by a one-way brake B3 parallel to the second brake B2.

The first, second, and third clutches K1, K2, K3, and the first and second brakes B1, B2 are controlled, i.e., engaged and disengaged, to establish gear positions and control gear shifts. Specifically, when the first, second, and third clutches K1, K2, K3, and the first and second brakes B1, B2 are engaged and disengaged as shown in Table 1 below, the transmission mechanism can establish five forward gear positions (1ST, 2ND, 3RD, 4TH, and 5TH) and a single reverse gear position (REV).

As shown in Table 1, a 6TH gear position can be established when the second clutch K2 and the first brake B1 are engaged. The 6TH gear position is not established while the automobile is actually running, but is used as a controlling intermediate gear position when a certain upshift is carried out.

TABLE 1

| Gear position | K1 | K2 | K3 | B1 | B2 |
|---|---|---|---|---|---|
| 1ST | ○ | | | | (○) |
| 2ND | ○ | | | | ○ |
| 3RD | ○ | | | ○ | |
| 4TH | ○ | ○ | | | |
| 5TH | | ○ | ○ | | |
| REV | | | ○ | | ○ |
| 6TH | | ○ | | ○ | |

In Table 1, those clutches and brakes which are marked with "○" are engaged. The second brake B2 is marked with "(○)" is the 1st gear position because power from the engine can be transmitted through the one-way brake B3 even if the second brake B2 is not engaged. Specifically, when the first clutch K1 is engaged, power from the engine can be transmitted at the speed reduction ratio of the 1ST gear position and the 1ST gear position is established even if the second brake B2 is not engaged. However, since power from the road to the engine cannot be transmitted, an engine brake cannot be applied in the 1ST gear position when the second brake B2 is not engaged, and an engine engine brake can be applied in the 1ST gear position when the second brake B2 is engaged.

As can be seen from Table 1, each of the five forward gear positions (1ST-5TH) is established when two of the clutches and the brakes (hereinafter also referred to as engaging means) are engaged. For shifting between two adjacent gear positions, one of the two engaging means is disengaged and another engaging means engaged, with the two engaging means being not simultaneously disengaged or engaged. Consequently, the process of controlling the automatic transmission is relatively simple when the transmission is to be shifted successively through gear positions.

Figure 2:
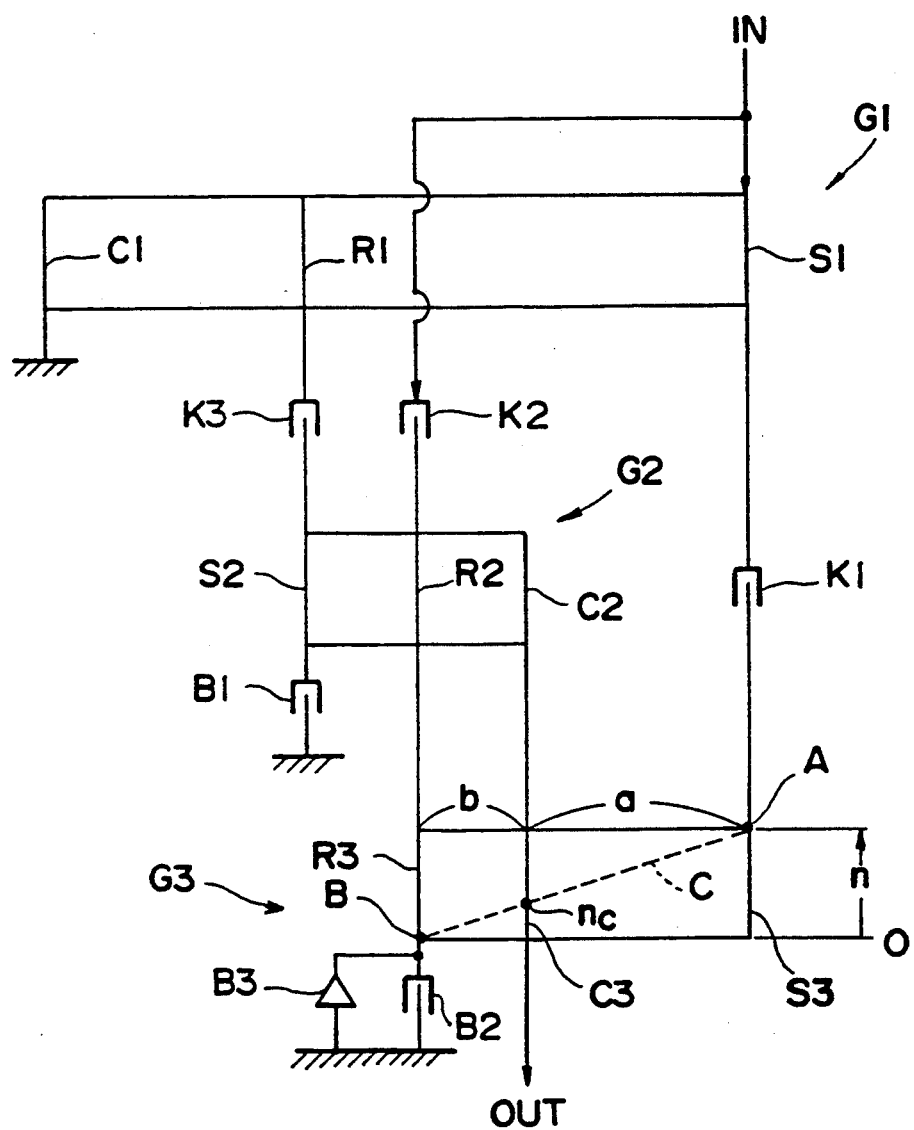
FIG. 2 is a diagram showing the relationship between the speeds o s of the automatic transmission.

The relationship between the speeds of elements of the planetary gear automatic transmission is shown in FIG. 2.

In FIG. 2, the planetary gear trains G1, G2, G3 are represented by respective diagram segments, and vertical lines indicate respective elements and the lengths of the vertical lines indicate the rotational speeds of the elements in each of the diagram segments. In each of the diagram segments, the distances between the vertical lines are inversely proportional to the reciprocal of the number of gear teeth of the sun gear and the reciprocal of the number of gear teeth of the ring gear, respectively.

In the third planetary gear train G3, for example, the three vertical lines represent, on the order from the right, the third sun gear S3, the third carrier C3, and the third ring gear R3, respectively, and the upward lengths of these vertical lines indicate the rotational speeds n in the forward direction. The distance "a" between the vertical line indicating the third sun gear S3 and the vertical line indicating the third carrier C3 corresponds to the reciprocal (=1/Zs) of the number Zs of gear teeth of the third sun gear S3, and the distance "b" between the vertical line indicating the third carrier C3 and the vertical line indicating the third ring gear R3 corresponds to the reciprocal (=1/Zr) of the number Zr of gear teeth of the third ring gear R3. When the first clutch K1 is engaged, rotating the third sun gear S3 at the same speed n as the speed of the input shaft $8a$, and the third ring gear R3 is fixed against rotation by the second brake B2, the third carrier C3 rotates at a speed nc that is indicated at the intersection between the vertical line representing the third carrier C3 and a line C interconnecting a point A which indicates the rotation of the third sun gear S3 and a point B which indicates the fixed condition, or non-rotation, of the third ring gear R3.

The first and second planetary gear trains G1, G2 are similarly defined in FIG. 2. Since, however, the first and second planetary gear trains G1, G2 are double-pinion planetary gear trains, the direction of rotation of the ring gear with respect to the sun gear is opposite to that in the third planetary gear train G3 which is a single-pinion planetary gear train. In the third planetary gear train G3, the vertical lines indicative of the sun gear S3 and the ring gear R3 are positioned one on each side of the vertical line indicative of the carrier C3. In the first and second planetary gear trains G1, G2, which are double-pinion planetary gear trains, the vertical lines indicative of the sum gears S1, S2 and the ring gears R1, R2 are positioned on the same side of the vertical lines indicative of the carriers C1, C2, respectively. In the first and second planetary gear trains G1, G2, the distances between the vertical lines are in inverse proportion to the reciprocals of the numbers of gear teeth of the sun gear and the ring gears, respectively.

Table 2 below shows how the elements (the ring gears, the carriers, and the sun gears) shown in FIG. 2 are coupled.

TABLE 2

| Planetary gear train | Rotational member | | | | | λ |
|---|---|---|---|---|---|---|
| | 1st | 2nd | 3rd | 4th | 5th | |
| G1 | C1 | R1 | | | S1 | 0.45 |
| G2 | | S2 | R2 | C2 | | 0.43 |
| G3 | | | R3 | C3 | S3 | 0.39 |

As can be understood from Table 2, the first carrier C1 solely serves as a first rotational member, the first ring gear R1 and the second sun gear S2 are coupled and jointly serve as a second rotational member, the second ring gear R2 and the third ring gear R3 are coupled and jointly serve as a third rotational member, the second carrier C2 and the third carrier C3 are coupled and jointly serve as a fourth rotational member, and the first sun gear S1 and the third sun gear S3 are coupled and jointly serve as a fifth rotational member.

Table 2 also shows the ratios λ(=Zs/Zr) between the numbers Zs of gear teeth of the sun gears and the numbers Zr of gear teeth of the ring gears. These ratios indicate the sizes of the sun and ring gears, and also the dimensions between the sun and ring gears, i.e., the sizes of the planetary gears. It is necessary that the ratios λ be in the range of from 0.3 to 0.6 for the planetary gear trains to be physically feasible.

Figure 3:
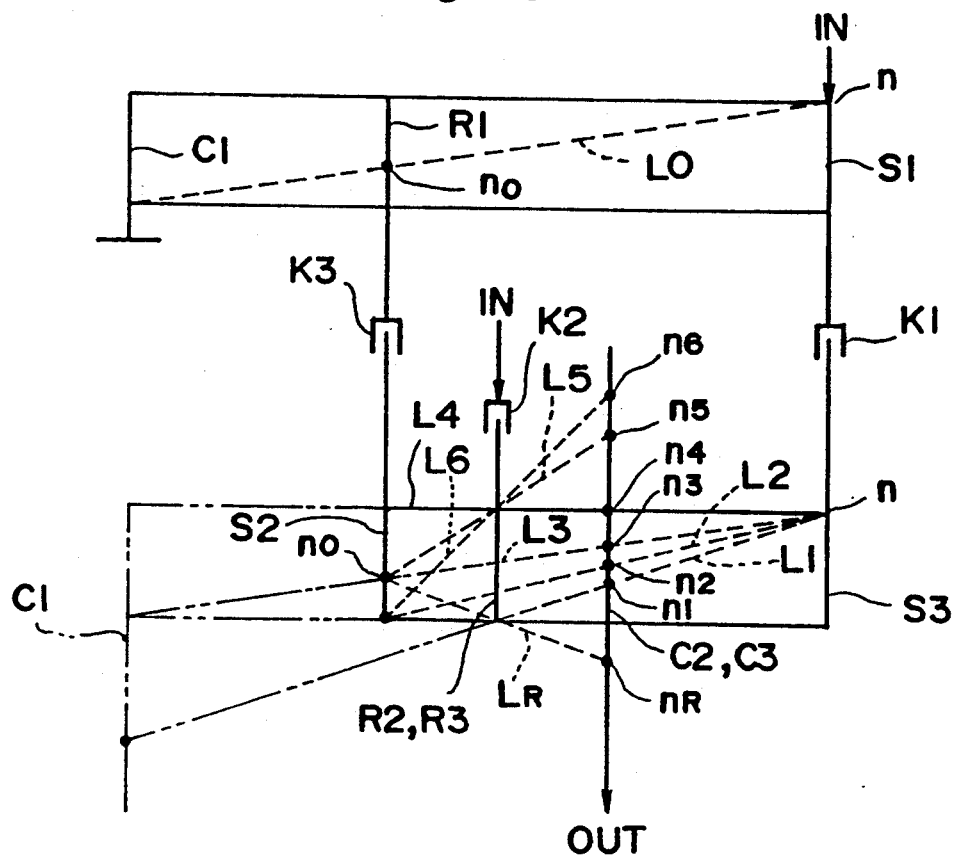
FIG. 3 is a diagram showing the relationship between the speeds of the automatic transmission.

The ratio of the rotational speed of the output gear $8b$ to the rotational speed of the input shaft $8a$, i.e., the speed reduction ratio, will be determined in each of the gear positions using the diagrams of FIGS. 2 and 3.

In this automatic transmission, the first sun gear S1 of the first planetary gear train G1 is coupled to the input shaft 8a at all times for rotation at the same speed n as that of the input shaft 8a, and the first carrier C1 is fixed against rotation at all times, irrespective of the gear position selected. The first ring gear R1 rotates at a speed n0 that is indicated at the intersection between the vertical line representing the first ring gear R1 and a line L0 interconnecting a point which indicates the rotation of the first sun gear S1 and a point which indicates the fixed condition, or non-rotation, of the first carrier C1. The first ring gear R1 rotates at the speed n0 regardless of the gear position selected.

In the 1ST gear position, the first clutch K1 and the second brake B2 are engaged. Since the ring gears R2, R3 and the carrier C2, C3 of the second and third planetary gear trains G2, G3 are mechanically coupled to each other, the second and third planetary gear trains G2, G3 are united together, and may be combined as shown in FIG. 3. Since the third clutch K3 is disengaged, however, the first planetary gear train G1 is separate from the second and third planetary gear trains G2, G3, and only one element (first sun gear S1) of the first planetary gear train G1 is coupled to the second and third planetary gear trains G2, G3.

If it is assumed that the input shaft 8a rotates at a speed n, then the third sun gear S3 coupled to the input shaft 8a also rotates at the speed n. Since the second and third ring gears R2, R3 are fixed against rotation by the second brake B2, the output gear 8b coupled to the carriers C2, C3 rotates at a speed n1 that is indicated at the intersection between the vertical line representing the second and third carriers C2, C3 and a line L1 interconnecting a point which indicates the rotation of the third sun gear S3 and a point which indicates the fixed condition, or non-rotation, of the ring gears R2, R3.

In the 2ND gear position, the first clutch K1 remains engaged, the second brake B2 is disengaged, and the first brake B1 is engaged. The third sun gear S3 rotates at the same speed n as the speed of the input shaft 8a, and the second sun gear S2 is fixed against rotation. The output gear 8b coupled to the carriers C2, C3 rotates at a speed n2 that is indicated at the intersection between the vertical line representing the second and third carriers C2, C3 and a line L2 interconnecting the point which indicates the rotation of the third sun gear S3 and a point which indicates the fixed condition, or non-rotation, of the second sun gear S2.

In the 3RD gear position, the first clutch K1 remains engaged, the first brake B1 is disengaged, and the third clutch K3 is engaged. The third sun gear S3 also rotates at the same speed n as the speed of the input shaft 8a. Because the second sun gear S2 is coupled to the first ring gear R1 by the third clutch K3, the second sun gear S2 rotates at the same speed n0 as the speed of the first ring gear R1. The output gear 8b coupled to the carriers C2, C3 rotates at a speed n3 that is indicated at the intersection between the vertical line representing the second and third carriers C2, C3 and a line L3 interconnecting the point which indicates the rotation of the third sun gear S3 and a point which indicates the rotation of the second sun gear S2.

In the 4TH gear position, the first clutch K1 remains engaged, the third clutch K3 is disengaged, and the second clutch K2 is engaged. The first, second, and third planetary gear trains G1, G2, G3 rotate together i unison with the input shaft 8a. The third sun gear S3 and the second and third ring gears R2, R3 rotate at the same speed n as the speed of the input shaft 8a. The output gear 8b coupled to the carriers C2, C3 rotates at a speed n4 (=n) that is indicated at the intersection between the vertical line representing the second and third carriers C2, C3 and a horizontal solid line L4.

In the 5TH gear position, the second clutch K2 remains engaged, the first clutch K1 is disengaged, and the third clutch K3 is engaged. The second and third ring gears R2, R3 rotates at the same speed n as the speed of the input shaft 8a. Because the second sun gear S2 is coupled to the first ring gear R1 by the third clutch K3, the second sun gear S2 rotates at the same speed n0 as the speed of the first ring gear R1. The output gear 8b coupled to the carriers C2, C3 rotates at a speed n5 that is indicated at the intersection between the vertical line representing the second and third carriers C2, C3 and a line L5 interconnecting a point which indicates the rotation of the second and third ring gears R2, R3 and a point which indicates the rotation of the second sun gear S2.

In the 6TH gear position, which is not established as an actual gear position but as a temporary shifting control gear position, the second clutch K2 and the first brake B1 are engaged. The second and third ring gears R2, R3 rotates at the same speed n as the speed of the input shaft 8a, and the second sun gear S2 is fixed against rotation. Therefore, the output gear 8b coupled to the carriers C2, C3 rotates at a speed n6 that is indicated at the intersection between the vertical line representing the second and third carriers C2, C3 and a line L6 interconnecting the point which indicates the rotation of the second and third ring gears R2, R3 and the point which indicates the fixed condition of the second sun gear S2.

In the REV (reverse) gear position, the third clutch K3 is engaged, and the second brake B2 is engaged. Because the second sun gear S2 is coupled to the first ring gear R1 by the third clutch K3, the second sun gear S2 rotates at the same speed n0 as the speed of the first ring gear R1. The second and third ring gears R2, R3 are fixed against rotation. The output gear 8b coupled to the carriers C2, C3 rotates at a speed nR that is indicated at the intersection between the vertical line representing the second and third carriers C2, C3 and a line LR interconnecting the point which indicates the rotation of the second sun gear S2 and the fixed condition of the second and third ring gears R2, R3.

Figure 4:
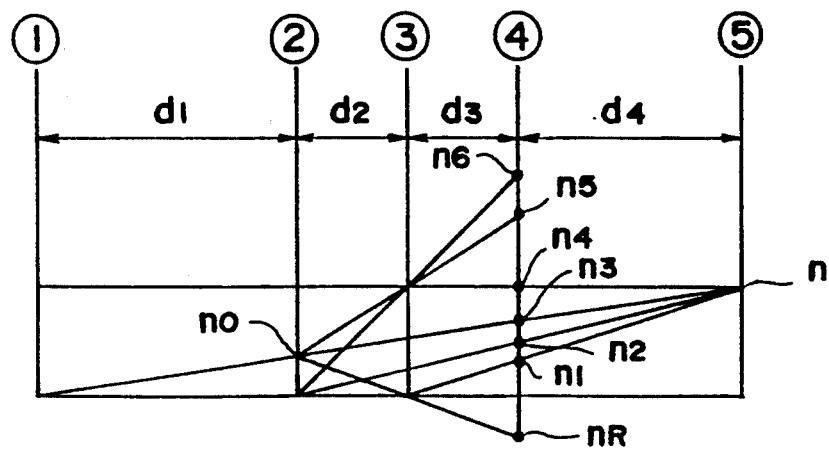
FIG. 4 is a diagram showing the relationship between the speeds of the automatic transmission.

The rotational speed of the output gear 8b with respect to the rotational speed n of the input shaft 8a is determined as described above. The rotational speeds of the output gear 8b in the respective gear positions are shown in FIG. 4. In FIG. 4, the five vertical lines ①~⑤ represent the first through fifth rotational members, respectively, and the distances d1~d4 between the vertical lines are uniquely determined once the speed reduction ratios in the respective gear positions are given. In this transmission mechanism, for example, the speed reduction ratios are set up so that the distances d1~d4 between the vertical lines are as follows:

$$d1 : d2 : d3 : d4 = 455 : 111 : 149 : 286.$$

As described above, the gear positions can be selectively established when the clutches and the brakes are controlled for engagement and disengagement as shown in Table 1. Shifting between two adjacent gear positions can be achieved by disengaging one other engaging means (a clutch or a brake) and engaging only one other engaging means. Therefore, the transmission mechanism can relatively simply be controlled when it is to be shifted successively through the gear positions.

For shifting the transmission mechanism up to the 5TH gear position while the automobile is running in the 2ND gear position, however, it is necessary to disengage two engaging means, i.e., the first clutch K1 and the first brake B1, and to engage two other engaging means, i.e., the second and third clutches K2, K3. Such shifting from the 2ND gear position to the 5TH gear position is required as when the accelerator pedal is quickly returned or the shift lever is moved from a 2ND range to a D range, for example.

According to the present invention, the transmission mechanism is controlled to carry out easily and smoothly the above shifting from the 2ND gear position to the 5TH gear position. The process of controlling the transmission mechanism according to the present invention will be described below.

Figure 5:
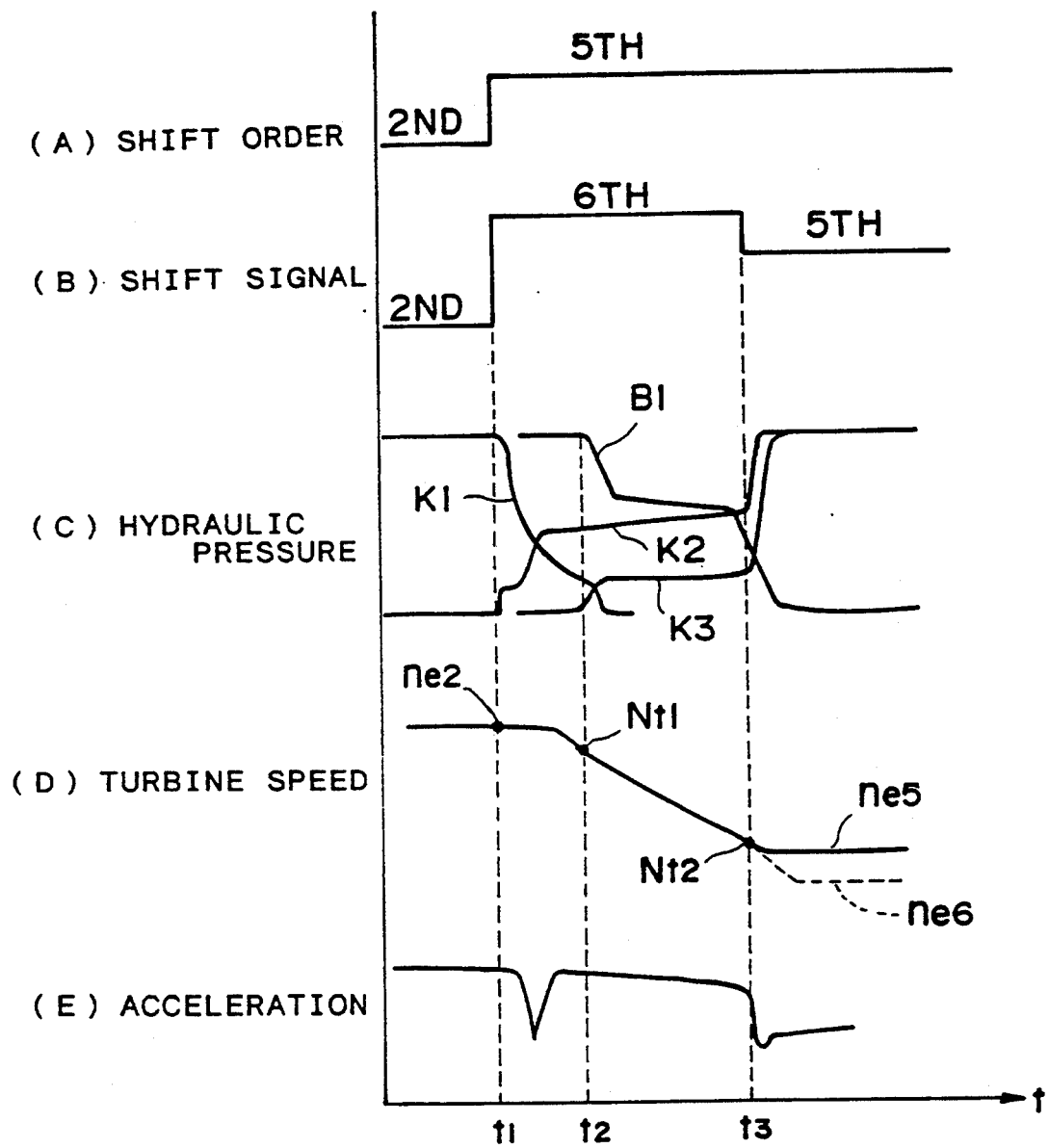
FIG. 5 is a graph showing the manner in which a shift command, a shift signal, hydraulic pressure, turbine speed, and acceleration vary with time when the automatic transmission is shifted from a second gear position to a fifth gear position.
Figure 8:
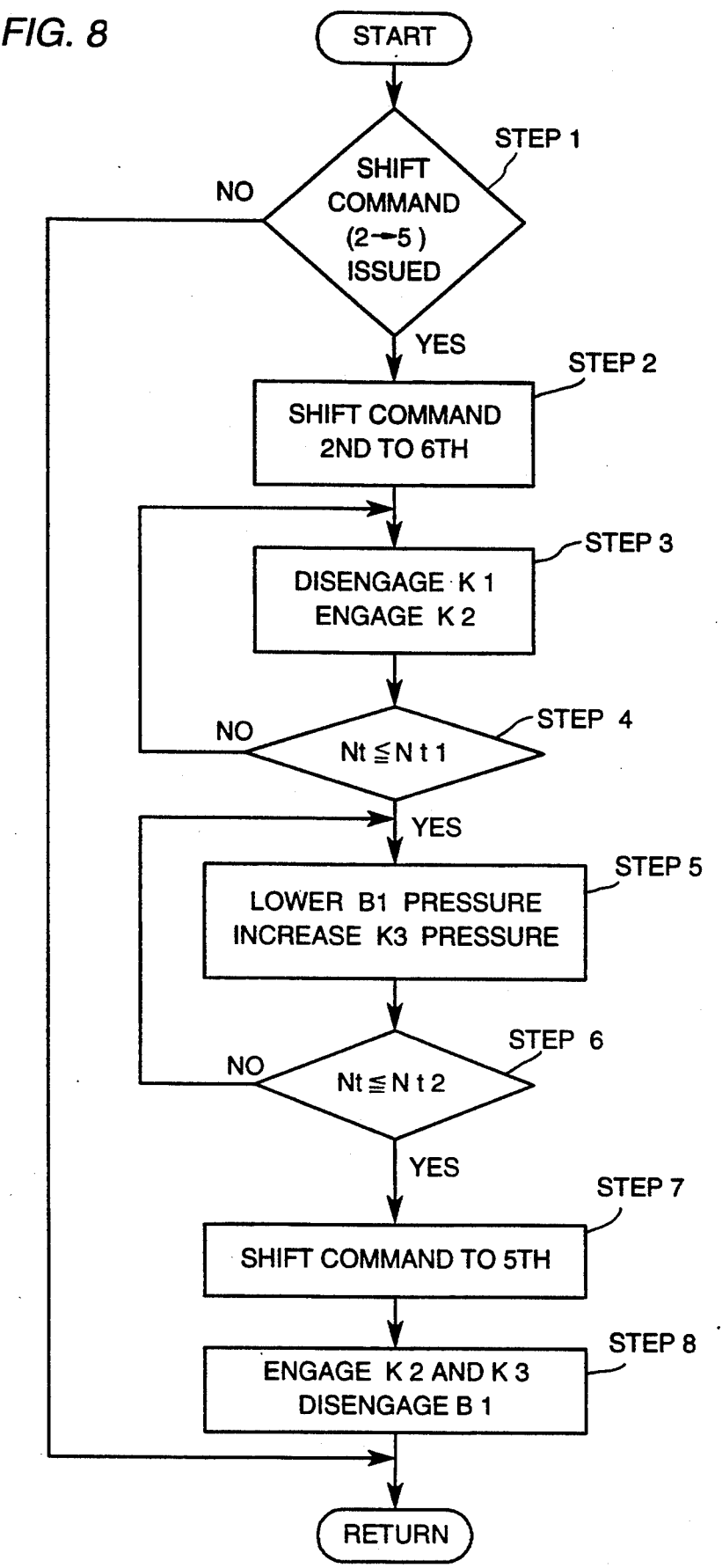
FIG. 8 is a flow chart representing the method of upshifting from the 2ND gear position to the 5TH gear position according to the present invention.

FIG. 5 shows how a shift signal, hydraulic pressure, turbine speed, and acceleration vary with time when a shift command for shifting from the 2ND gear position to the 5TH gear position is issued at a time t1. FIG. 8 shows how a shift from the 2ND gear position to the 5TH gear position to carried out. To avoid control complexities which would otherwise occur for shifting from the 2ND gear position to the 5TH gear position through disengagement of two engaging means, i.e., the first clutch K1 and the first brake B1, and engagement of two other engaging means, i.e., the second and third clutches K2, K3, a shift signal is issued for shifting from the 2ND gear position to the 6TH gear position in response to the shift command (STEP 1and 2 in FIG. 8).

To shift from the 2ND gear position to the 6TH gear position, the first brake B1 remains engaged, the first clutch K1 is disengaged and the second clutch K2 is engaged, as shown in Table 1 (Step 3 in FIG. 8). Such a shift control procedure is relatively simple.

The rotational speeds of the gears of the transmission mechanism vary in the different gear positions. The varying rotational speeds of the gears will be described below with reference to FIG. 6.

In the 2ND gear position, the first clutch K1 is engaged, rotating the third sun gear S3 at the same speed as the speed of the input shaft 8a, i.e., the same speed ne2 as that of the turbine of the torque converter 10, and the second sun gear S2 is fixed against rotation by the first brake B1. The output gear 8b rotates at a speed Nout which is indicated at the intersection between the vertical line indicating the second and third carriers C2, C3 and a straight line La interconnecting the point which indicates the rotation of the third sun gear S3 and the point which indicates the fixed condition of the second sun gear S2.

When a shift signal for shifting up to the 6TH gear position is issued at this time (Step 2in FIG. 8), the hydraulic pressure supplied to the first clutch K1 is lowered to disengage the first clutch K1 (Step 3 in FIG. 8), disconnecting the third sun gear S3 from the input shaft 8a, and the hydraulic pressure supplied to the second clutch K2 is increased to engage the second clutch K2 (Step 3 in FIG. 8), connecting the second and third ring gears R2, R3 to the input shaft 8a. In FIG. 5, the hydraulic pressure supplied to the second clutch K2 is increased up to an intermediate level which is a minimum pressure level required to engage the second clutch K2. The second clutch K2 is thus prevented from being abruptly engaged and hence from producing an engagement shock.

Upon shifting to the 6TH gear position, since the inertial mass connected to the output gear 8b is considerably larger than the inertial mass connected to the input shaft 8a, the rotational speed of the input shaft 8a, i.e., the rotational speed of the turbine, decreases whereas the rotational speed Nout of the output gear 8b remains constant. The rotational speed of the input shaft 8a is lowered toward a rotational speed ne6 corresponding to the speed reduction ratio of the 6TH gear position. Specifically, the rotational speed ne6 is indicated at the intersection between the vertical line indicating the second and third ring gears R2, R3 and the straight line La. The shifting to the 6TH gear position is completed when the rotational speed of the second and third ring gears R2, R3 becomes ne6.

In the control process according to the present invention, the rotational speed of the input shaft 8a or the turbine Nt is detected. The hydraulic pressure supplied to the first brake B1 is lowered to an intermediate pressure level at a time t2 when the turbine speed decreases to a predetermined rotational speed Nt1 (STEPS 4 and 5 in FIG. 8). Such a reduction in the hydraulic pressure is effected in order to quickly disengage the first brake B1 upon shifting to the 5TH gear position. At the time t2, the hydraulic pressure supplied to the third clutch K3 is slightly increased to a level that is high enough to bring the clutch plates thereof close to each other, but low enough not to engage the third clutch K3 (STEPS 4 and 5 in FIG. 8). In this manner, the transmission mechanism can be quickly shifted into the 5TH gear position.

Figure 6:
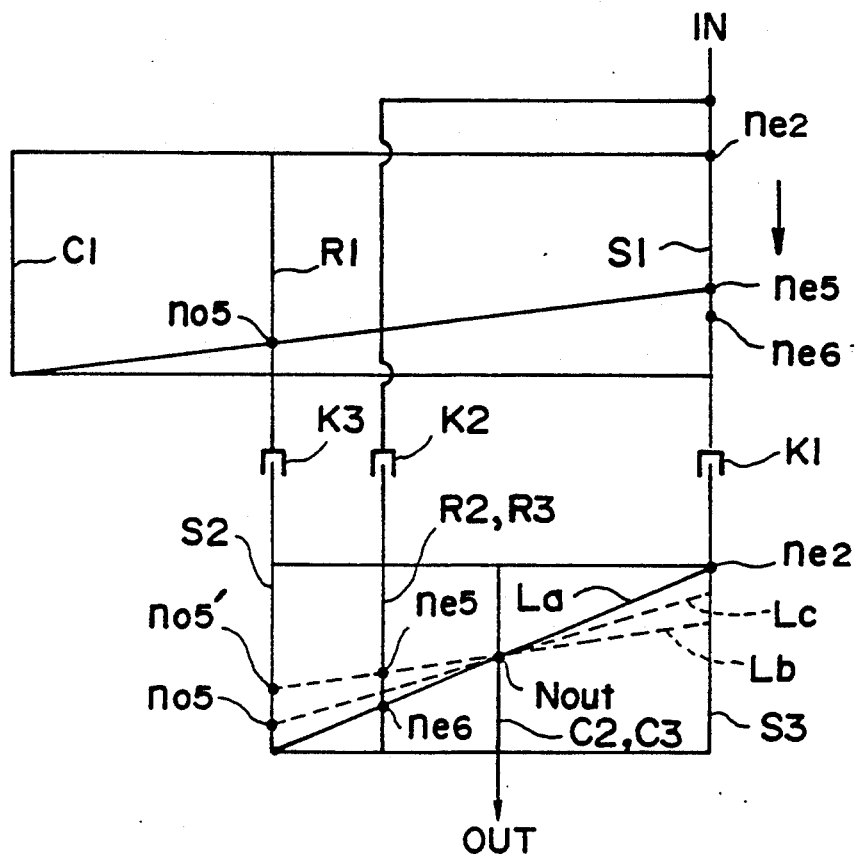
FIG. 6 a diagram showing the relationship between the speeds of elements of the automatic transmission when the automatic transmission is shifted from the second gear position to the fifth gear position.

When the detected rotational speed Nt is lowered to a rotational speed Nt2 that is slightly higher than a rotational speed ne5 corresponding to the speed reduction ratio in the 5TH gear position, i.e., at a time t3 when the rotating condition is substantially equal to the rotating condition in the 5TH gear position, a shift signal is outputted for shifting to the 5TH gear position (Step 6, 7, and in FIG.). In FIG. 6, the rotating condition in the 5TH gear position is reached when the rotational speed of the second and third gears R2, R3 coupled to the input shaft 8a becomes substantially ne5 (Nt2). At this time, the rotational speeds of the elements are indicated at the intersections between their vertical lines and a dotted straight line Lb.

The rotational speed of the input shaft 8a is therefore prevented from being lowered to the rotational speed ne6 corresponding to the 6TH gear position. The transmission mechanism is smoothly shifted into the 5TH gear position at the time the rotational speed of the input shaft 8a is equalized to the rotational speed ne5 corresponding to the 5TH gear position. According to the control process of the invention, the 6TH gear position (controlling intermediate gear position) is selected, and the transmission is controlled so as to be shifted into the 6TH gear position. However, before the rotating condition of the input shaft 8a becomes the rotating condition in the 6TH gear position and the shifting to the 6TH gear position is completed, the transmission mechanism is shifted into the 5TH gear position when the rotating condition corresponds to the 5TH gear position, which is a target gear position to be reached.

As shown in Table 1, the shifting from the 6TH gear position to the 5TH gear position can easily be controlled as it is necessary to disengage the first brake B1 and engage the third clutch K3 with the second clutch K2 remaining engaged. Therefore, the transmission mechanism can easily be controlled for smooth shifting from the 2ND gear position to the 5TH gear position without making the driver and passengers of the automobile feel awkward.

If the transmission mechanism is shifted into the 5TH gear position when the rotational speed of the input shaft 8a becomes the rotational speed ne5 corresponding to the 5TH gear position, i.e., the rotating condition in the transmission mechanism is represented by the dotted straight line Lb in FIG. 6, then the rotational speed of the second sun gear S2 varies because the first brake B1 is disengaged and the third clutch K3 is engaged. That is, when the rotational speed of the input shaft 8a is lowered to the speed ne5 while the 6TH gear position is being selected, the first ring gear R1 rotates at a speed n05 whereas the second sun gear S2 rotates at a speed n05'. The transmission mechanism is then shifted into the 5TH gear position with the third clutch K3 engaged, whereupon the rotational speed of the second sun gear S2 varies from the speed n05' to the speed n05. The rotating conditions of the second and third planetary gear trains G2, G3 therefore vary from the dotted straight line Lb to a dotted straight line Lc. Consequently, as shown in FIG. 5, the acceleration is temporarily lowered at the time t3 for shifting to the 5TH gear position.

In the above control process, the output rotation is pick up from the fourth rotational member among the first through fifth rotational members of the transmission mechanism which is composed of three planetary gear trains. However, the output rotation may be picked up from the second rotational member.

It is also possible to pick up the output rotation from the central rotational member, i.e., the third rotational member, in the control process. An automatic transmission used in this control process will briefly be described below.

Figure 7:
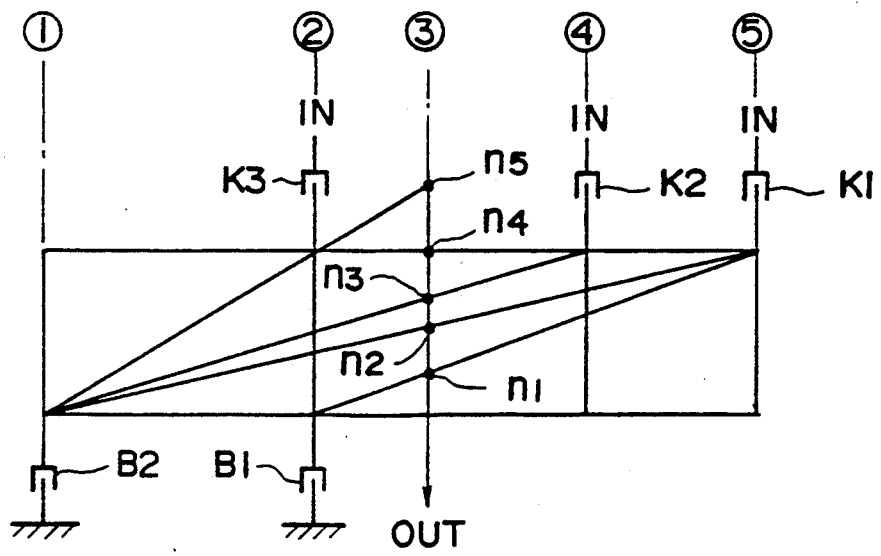
FIG. 7 is a diagram showing the relationship between the speeds of elements of another automatic transmission which is controlled by the method according to the present invention.

The automatic transmission is schematically shown in FIG. 7. In FIG. 7, the first rotational member ① can be fixed against rotation by the second brake B2, and the second rotational member ② can be coupled to the input shaft by the third clutch K3 and can be fixed against rotation by the first brake B1. The fourth and fifth rotational members ④, ⑤ can be coupled to the input shaft by the second and first clutches K2, K1, respectively.

The clutches K1, K2, K3 and the brakes B1, B2 can be controlled for engagement and disengagement (see Table 3 below) to establish five forward gear positions (1ST~5TH) as shown in FIG. 7.

TABLE 3

| Gear position | K1 | K2 | K3 | B1 | B2 |
|---|---|---|---|---|---|
| 1ST | O | | | O | |
| 2ND | O | | | | O |
| 3RD | | O | | | O |
| 4TH | | O | O | | |
| 5TH | | | O | | O |
| 4TH' | O | O | | | |

In this automatic transmission, the control process is applied to shift from the 1ST gear position to the 3RD gear position. In shifting from the 1ST gear position to the 3RD gear position, a 4TH' gear position which, can be established by engaging the first and second clutches K1, K2, is used as a controlling intermediate gear position, as shown in Table 3. The normal 4TH gear position, is established by engaging the second and third clutches K2, K3.

The control process is effected in the same manner as described above. To shift from the 1ST gear position to the 3RD gear position, the transmission is first shifted from the 1ST gear position into the controlling intermediate gear position, i.e., the 4TH' gear position, and when the rotational speed of the input shaft reaches the rotational speed corresponding to the 3RD gear position, the transmission is shifted into the 3RD gear position.

Although certain preferred embodiments of the present invention have been shown and described in detail, it should be understood that various changes and modifications by be made therein without departing from the scope of the appended claims.

What is claimed is:

1. A method of controlling an automatic transmission having, between input and output shafts, a plurality of power transmitting paths composed of combinations of planetary gear trains, and a plurality of engaging means for selecting one of the power transmitting paths for establishing a desired gear position, to effect an upshift from a present gear position to a target gear position that has a higher speed reduction ratio than a speed reduction ratio of the present gear position through disengagement of two of said engaging means and engagement of two other of said engaging means, said method comprising the steps of:

selecting a controlling intermediate gear position that has a higher speed reduction ratio than the speed reduction ratio of said target gear position and which can be shifted to from said present gear position and said target gear position through disengagement of only one of said engaging means and engagement of another of said engaging means;

starting to shift from said present gear position to said controlling intermediate gear position in response to a command for said upshift;

detecting a rotating condition of said gear trains after the shifting from said present gear position to said controlling intermediate gear position is started; and shifting from said controlling intermediate gear position to said target gear position when the detected rotating condition reaches a rotating condition which substantially corresponds to a rotating condition of said target gear position.

2. A method according to claim 1, wherein said automatic transmission comprises a plurality of planetary gear trains, and said engaging means comprise a plurality of clutches and a plurality of brakes, and wherein two of said clutches and said brakes can selectively be engaged to establish each of a plurality of gear positions, and wherein the selecting step comprises selecting, as said controlling intermediate gear position, a gear position having a highest speed reduction ratio of a plurality of speed reduction ratios of said gear positions.

3. A method according to claim 1, wherein said automatic transmission comprises three planetary gear trains, and said engaging means comprise three clutches and two brakes, and wherein two of said clutches and said brakes can selectively be engaged to establish each of six forward gear positions, each of the six forward gear positions having a speed reduction ratio, and wherein the selecting step comprises selecting, as said controlling intermediate gear position, a gear position having a highest speed reduction ratio of the six speed reduction ratio of the six forward gear positions.

4. A method according to claim 1, wherein said rotating condition of said gear trains is detected as the rotational speed of said input shaft.

* * * * *